US008373887B2

(12) United States Patent
Hara et al.

(10) Patent No.: US 8,373,887 B2
(45) Date of Patent: Feb. 12, 2013

(54) IMAGE PROCESSING APPARATUS INCLUDING AN IMAGE PROCESSING UNIT, A MEMORY, A DETERMINATION UNIT, A DIVIDING UNIT, AND NON-TRANSITORY COMPUTER READABLE MEDIUM

(75) Inventors: Yuki Hara, Kanagawa (JP); Takuya Ohta, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/476,415

(22) Filed: May 21, 2012

(65) Prior Publication Data
US 2012/0300255 A1  Nov. 29, 2012

(30) Foreign Application Priority Data

May 26, 2011  (JP) ................. 2011-117934

(51) Int. Cl.
G06F 3/12 (2006.01)
G06K 15/00 (2006.01)
H04N 1/00 (2006.01)
H04N 1/60 (2006.01)
G09G 5/00 (2006.01)

(52) U.S. Cl. ........ 358/1.16; 358/1.15; 358/1.6; 358/1.9; 345/625; 345/630; 345/634; 345/643; 345/660

(58) Field of Classification Search ................. 358/1.15, 358/1.16, 1.17, 404, 1.6, 1.9, 3.01, 3.12, 358/3.23, 1.11, 501, 530; 345/625, 630, 345/634, 643, 649, 660, 676, 256, 501, 543, 345/544; 382/162, 164, 173, 276, 284, 296, 382/304, 305
See application file for complete search history.

(56) References Cited

U.S. PATENT DOCUMENTS 5,825,993 A * 10/1998 Shimura et al. ............. 358/1.16
6,052,200 A *  4/2000 Mitani ........................ 358/1.16
(Continued)

FOREIGN PATENT DOCUMENTS

JP  A-2007-152843   6/2007
JP  A-2008-284742  11/2008
JP  A-2010-003035   1/2010

OTHER PUBLICATIONS

Japanese Office Action issued in Application No. 2011-117934; Dated Jan. 10, 2012 (With Translation).

Primary Examiner — Benny Q Tieu
Assistant Examiner — Ngon Nguyen
(74) Attorney, Agent, or Firm — Oliff & Berridge, PLC

(57) ABSTRACT

An image processing apparatus includes an image processing unit, a memory, a determination unit, and a dividing unit. The image processing unit dynamically changes a configuration thereof, and executes image processing in accordance with the changed configuration. The memory includes a pre-processing information memory area, an ongoing-processing information memory area, and a post-processing information memory area. The determination unit determines a division position of printing information used for image processing to be executed by the image processing unit, at which an amount of printing information, an amount of intermediate information corresponding to the printing information, and an amount of image information corresponding to the printing information are less than or equal to memory capacities of the pre-processing information memory area, the ongoing-processing information memory area, and the post-processing information memory area, respectively. The dividing unit divides the printing information in accordance with the division position determined by the determination unit.

4 Claims, 12 Drawing Sheets

U.S. PATENT DOCUMENTS

| | | | | |
|---|---|---|---|---|
| 6,052,201 A | * | 4/2000 | Shibaki et al. | 358/1.16 |
| 2003/0133542 A1 | * | 7/2003 | Takahashi et al. | 379/68 |
| 2007/0188486 A1 | * | 8/2007 | Honmi | 345/419 |
| 2010/0245878 A1 | * | 9/2010 | Yamada | 358/1.13 |
| 2011/0066826 A1 | * | 3/2011 | Shimamura et al. | 712/200 |
| 2011/0235077 A1 | * | 9/2011 | Ito | 358/1.13 |

* cited by examiner

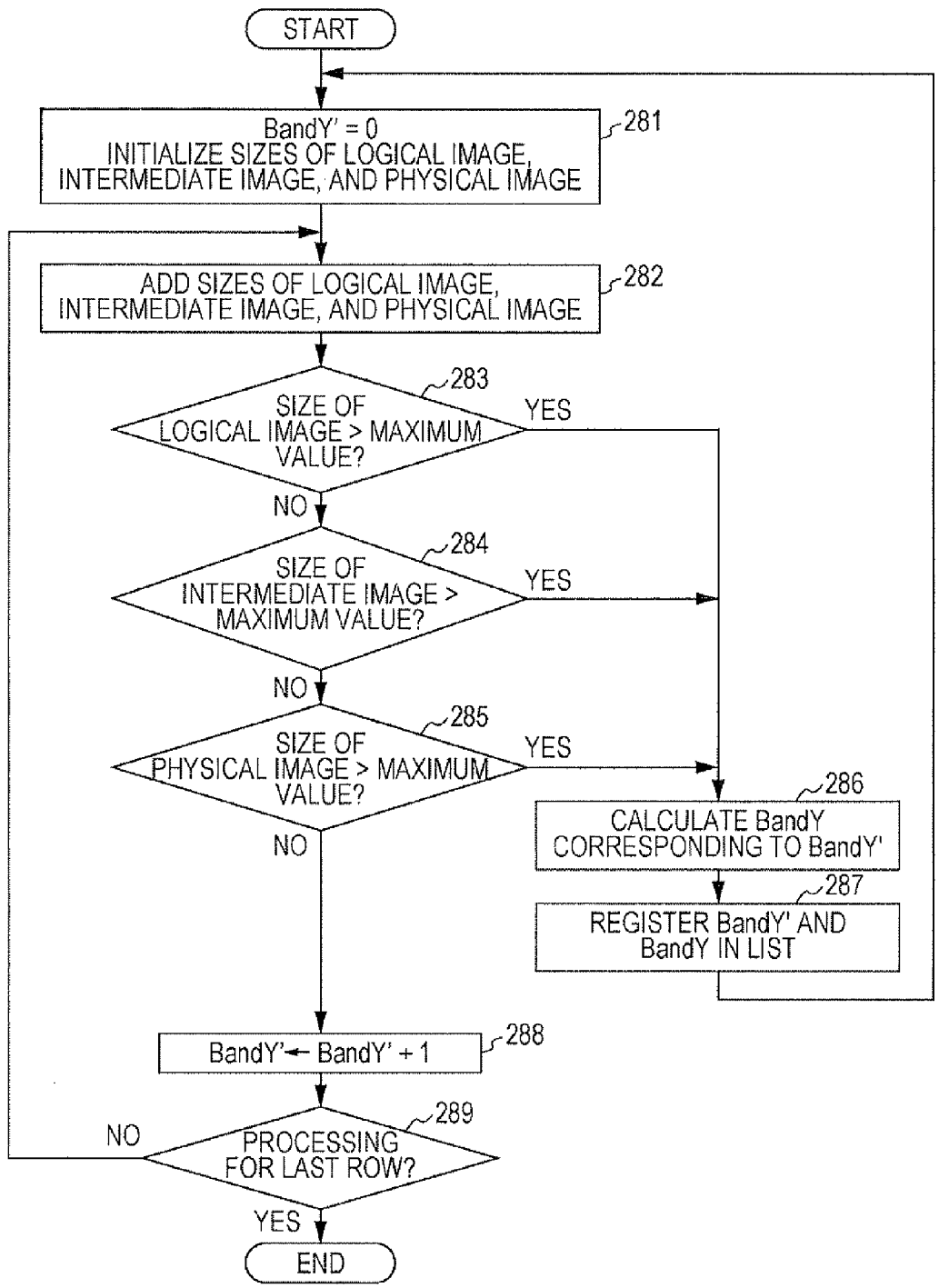

IMAGE PROCESSING APPARATUS INCLUDING AN IMAGE PROCESSING UNIT, A MEMORY, A DETERMINATION UNIT, A DIVIDING UNIT, AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-117934 filed May 26, 2011.

BACKGROUND (i) Technical Field

The present invention relates to an image processing apparatus and a non-transitory computer readable medium.

(ii) Related Art

Information processing apparatuses such as computers may be provided with external add-on devices that perform information processing using hardware, and information processing may be performed by such external devices to speed up information processing. In this case, there may be a limitation on the amount of information to be processed by an external device due to the memory capacity of the external device or any other reason.

SUMMARY

According to an aspect of the invention, there is provided an image processing apparatus including an image processing unit, a memory, a determination unit, and a dividing unit. The image processing unit dynamically changes a configuration thereof, and executes image processing in accordance with the changed configuration. The memory includes a pre-processing information memory area, an ongoing-processing information memory area, and a post-processing information memory area. The pre-processing information memory area stores setting information for setting a change of the configuration of the image processing unit, and printing information used for image processing to be performed by the image processing unit. The ongoing-processing information memory area stores intermediate information to be generated during image processing performed by the image processing unit. The post-processing information memory area stores image information generated through the image processing performed by the image processing unit. When causing the image processing unit to execute image processing, an amount of printing information, the determination unit calculates an amount of intermediate information corresponding to the printing information and an amount of image information corresponding to the printing information, in accordance with printing information to be used for the image processing to be executed, and determines a division position of the printing information at which the amount of printing information, the amount of intermediate information, and the amount of image information are less than or equal to a memory capacity of the pre-processing information memory area, a memory capacity of the ongoing-processing information memory area, and a memory capacity of the post-processing information memory area, respectively. The dividing unit divides the printing information to be used for the image processing to be executed by the image processing unit in accordance with the division position determined by the determination unit.

BRIEF DESCRIPTION OF THE DRAWINGS

Exemplary embodiments of the present invention will be described in detail based on the following figures, wherein:

FIG. 8 is a flowchart illustrating a flow of a division position calculation process for page processing;

DETAILED DESCRIPTION

An image processing apparatus and an image processing control program according to an exemplary embodiment of the present invention will be described in detail hereinafter with reference to the accompanying drawings.

First Exemplary Embodiment

Figure 1:
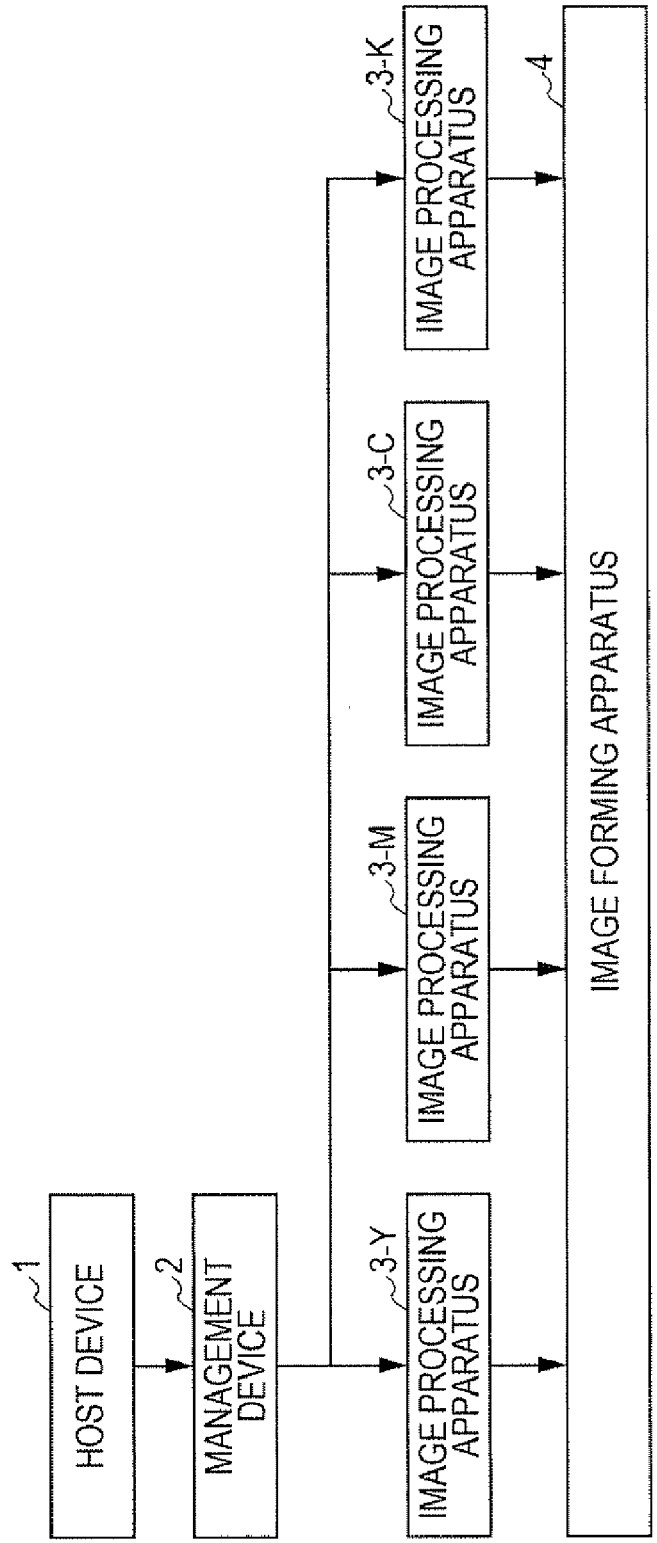
FIG. 1 is a block diagram illustrating an example configuration of an image forming system.

FIG. 1 is a block diagram illustrating an example configuration of an image forming system. The image forming system illustrated in FIG. 1 includes a host device 1, a management device 2, an image processing apparatus 3-Y, an image processing apparatus 3-M, an image processing apparatus 3-C, an image processing apparatus 3-K, and an image forming apparatus 4.

The host device 1 outputs printing information necessary to form an image.

The management device 2 separates the printing information into pieces about yellow (Y), magenta (M), cyan (C), and black (K), and outputs the yellow printing information, the magenta printing information, the cyan printing information, and the black printing information to the image processing apparatus 3-Y, the image processing apparatus 3-M, the image processing apparatus 3-C, and the image processing apparatus 3-K, respectively. The management device 2 further performs management and the like of the operations of the image processing apparatus 3-Y, the image processing apparatus 3-M, the image processing apparatus 3-C, and the image processing apparatus 3-K.

Each of the image processing apparatus 3-Y, the image processing apparatus 3-M, the image processing apparatus 3-C, and the image processing apparatus 3-K performs processing such as converting the printing information into image information, creating page information on the basis of the image information, and controlling an operation of the image forming apparatus 4 which is associated with the corresponding color.

The image forming apparatus 4 forms an image on a sheet of paper in accordance with the pieces of page information input from the image processing apparatus 3-Y, the image processing apparatus 3-M, the image processing apparatus 3-C, and the image processing apparatus 3-K.

Next, a description will be made of the image processing apparatus 3-Y, the image processing apparatus 3-M, the image processing apparatus 3-C, and the image processing apparatus 3-K. Since the image processing apparatus 3-Y, the image processing apparatus 3-M, the image processing apparatus 3-C, and the image processing apparatus 3-K have equivalent configurations and functions, one of them will be described as a typical example. The image processing apparatus described hereinafter may also be used in another image forming system such as an image forming system in which image processing for all colors is performed by a single image processing apparatus.

Figure 2:
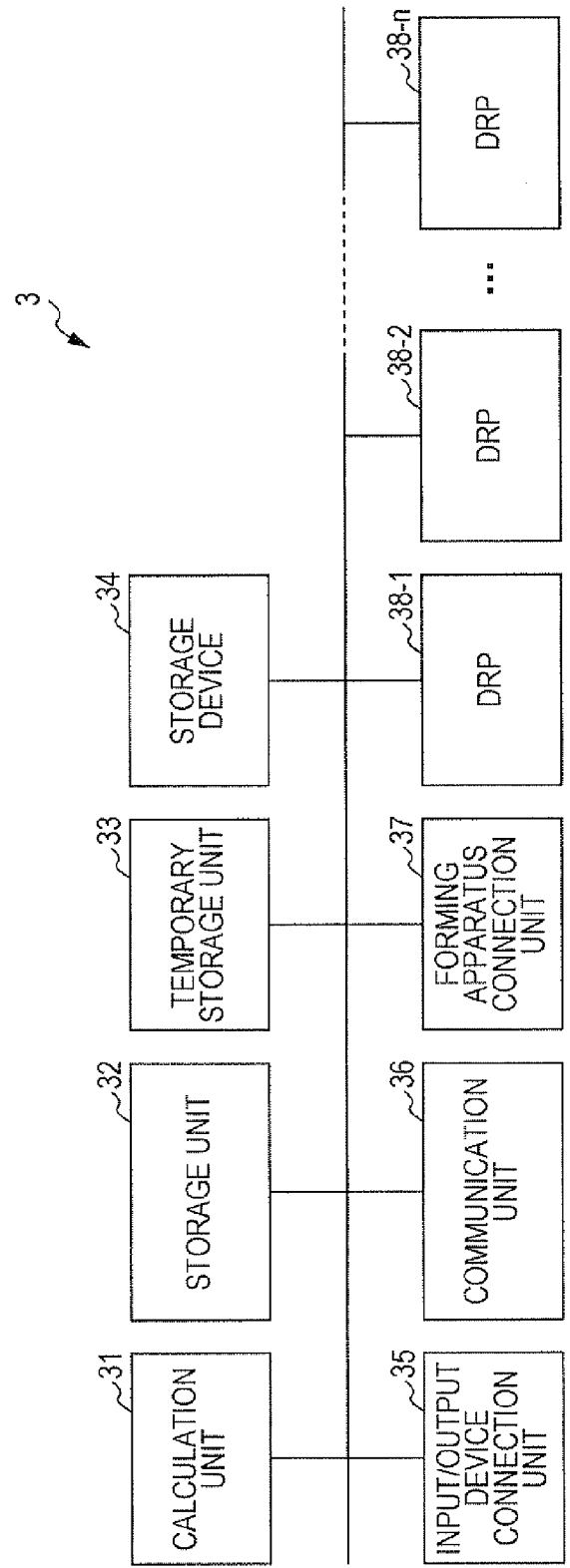
FIG. 2 illustrates an example configuration of an image processing apparatus.

FIG. 2 illustrates an example configuration of an image processing apparatus 3. The image processing apparatus 3 illustrated in FIG. 2 corresponds to the image processing apparatus 3-Y, the image processing apparatus 3-M, the image processing apparatus 3-C, and the image processing apparatus 3-K.

As illustrated in FIG. 2, the image processing apparatus 3 includes a calculation unit 31, a storage unit 32, a temporary storage unit 33, a storage device 34, an input/output device connection unit 35, a communication unit 36, a forming apparatus connection unit 37, and plural dynamically reconfigurable processors (DRPs) 38 (38-1 to 38-n).

The calculation unit 31 performs calculation processing, and may be implemented by a processor such as a central processing unit (CPU).

The storage unit 32 stores programs, setting information, etc., and may be implemented by a semiconductor storage element such as a read only memory (ROM) or a nonvolatile memory.

The temporary storage unit 33 may be used as a work area or the like when the calculation unit 31 performs calculation processing, for temporarily storing information etc., and may be implemented by a semiconductor storage element such as a random access memory (RAM).

The storage device 34 stores programs, setting information, printing information, image information, etc., and may be implemented by a magnetic disk or a semiconductor storage element.

The input/output device connection unit 35 is an interface to which user interface devices including a monitor device and an input device such as a keyboard and a pointing device are connected, and may be implemented by an integrated circuit, a connector, or any other suitable device.

The communication unit 36 is an interface used for communication when the image processing apparatus 3 sends and receives information etc. to and from the management device 2, and may be implemented by an integrated circuit, a connector, or any other suitable device.

The forming apparatus connection unit 37 is an interface used for communication when the image processing apparatus 3 exchanges information etc. with the image forming apparatus 4, and may be implemented by an integrated circuit, a connector, or any other suitable device.

The DRPs 38-1 to 38-n are processors configured to perform image processing, and are specifically dynamically reconfigurable. The DRPs 38 are configured to make internal data paths dynamically changeable to perform various kinds of image processing.

Figure 3:
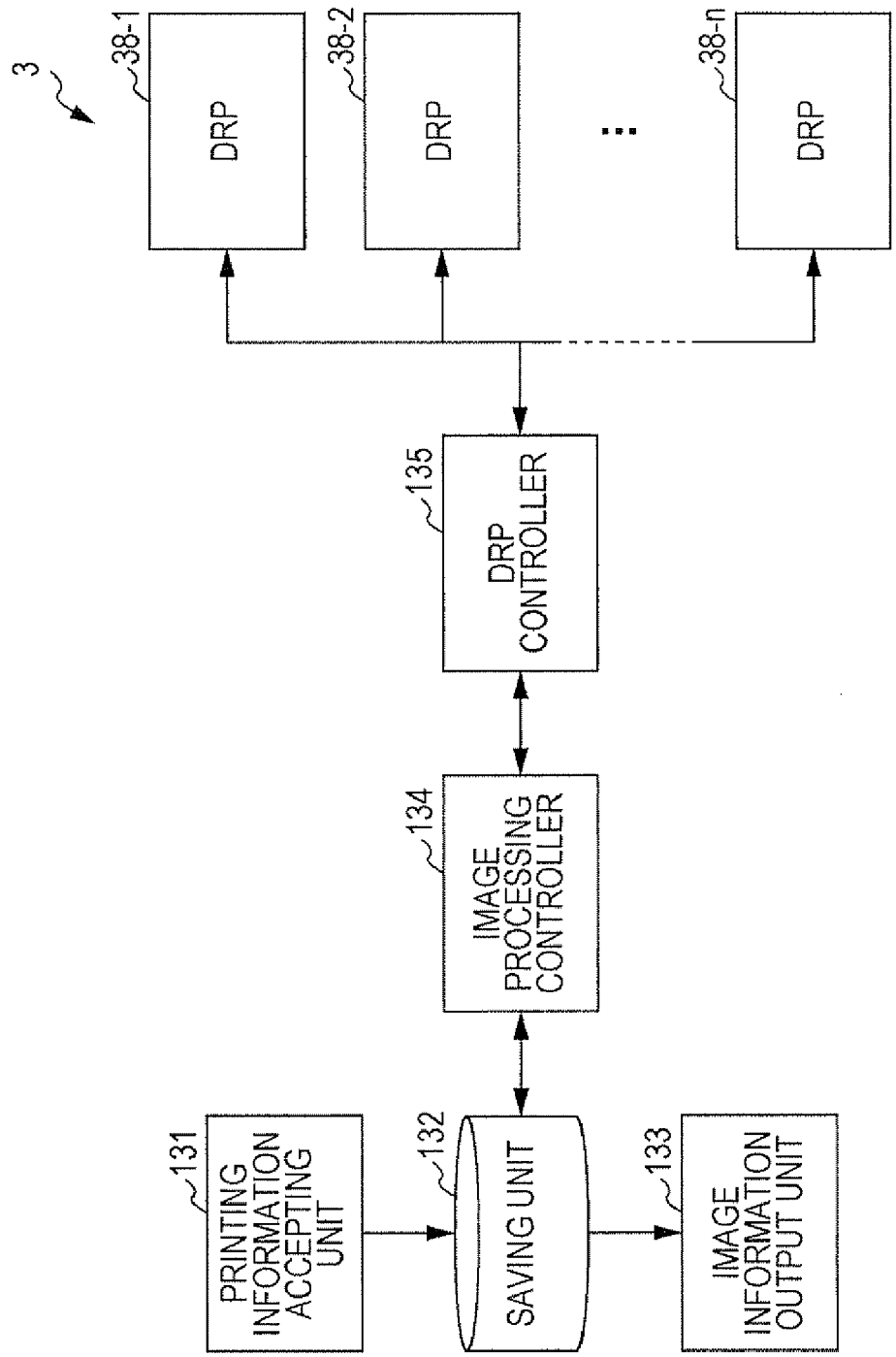
FIG. 3 is a block diagram illustrating an example functional configuration of the image processing apparatus.

Subsequently, a functional configuration of the image processing apparatus 3 will be described. FIG. 3 is a block diagram illustrating an example functional configuration of the image processing apparatus 3.

As illustrated in FIG. 3, the image processing apparatus 3 includes the respective functions of a printing information accepting unit 131, a saving unit 132, an image information output unit 133, an image processing controller 134, and a DRP controller 135.

The above functional units may be implemented by causing the calculation unit 31 and the like to operate in accordance with a program stored in the storage device 34. Further, the functional units implement the storage device 34, the communication unit 36, the forming apparatus connection unit 37, etc., if necessary. The program stored in the storage device 34 may be provided through an optical storage medium such as a compact disk read only memory (CD-ROM) or any other medium, and may also be provided over a network.

The printing information accepting unit 131 receives and accepts printing information transmitted from the management device 2. The printing information is received using the communication unit 36.

The saving unit 132 saves the printing information accepted by the printing information accepting unit 131, and image information and the like generated by the DRPs 38 on the basis of the printing information. The above information is stored using the storage device 34.

The image information output unit 133 outputs the image information generated by the DRPs 38 and saved in the saving unit 132, in accordance with the operation of the image forming apparatus 4. The image information is output using the forming apparatus connection unit 37.

The image processing controller 134 performs processing such as distributing printing information for causing each of the plural DRPS 38 to execute image processing. Further, the image processing controller 134 outputs the image information generated by each of the DRPS 38 to the saving unit 132.

The DRP controller 135 controls each of the plural DRPs 38. Specifically, the DRP controller 135 sends to each of the DRPS 38 an instruction for performing setting in accordance with the content of the image processing to be performed by the DRP 38, writes to each of the DRPs 38 printing information on which image processing is to be performed, reads from each of the DRPs 38 the image information generated through image processing, and performs any other necessary operation.

Here, information transmitted from the host device 1 via the management device 2 is described as printing information and information to be output to the image forming apparatus 4 is described as image information. More specifically, printing information is information to be input to the DRPs 38, and image information is information output from the DRPs 38. This implies that, depending on the content of image processing, image information output from the DRPs 38 may also be used as printing information.

Figure 4A:
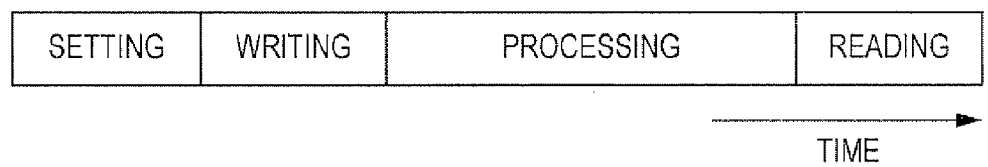
FIGS. 4A and 4B illustrate the operation of a dynamically reconfigurable processor (DRP)
Figure 4B:
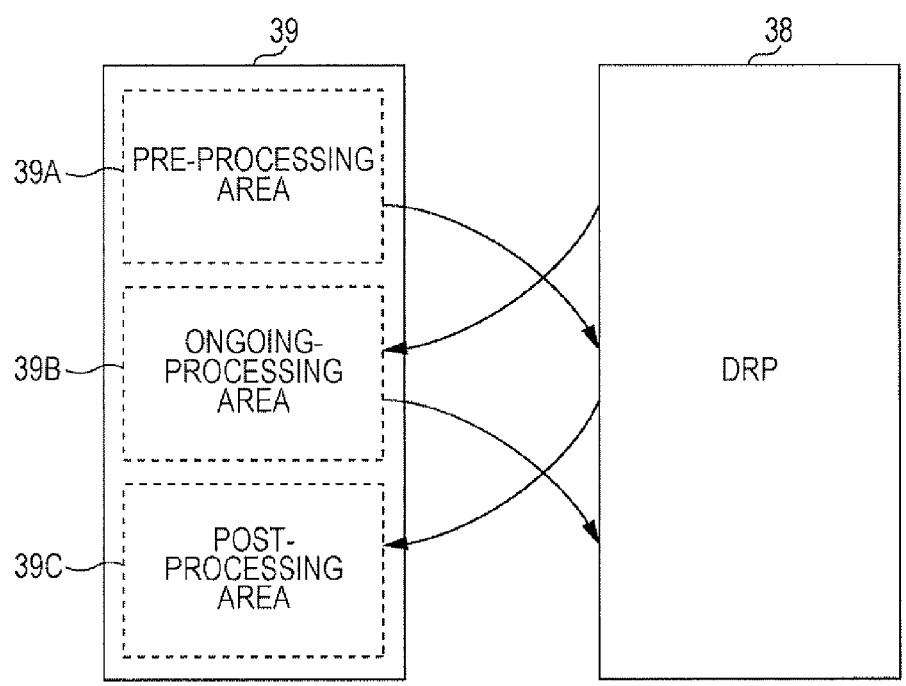

Next, an overview of the operation of each of the DRPs 38 will be described. FIGS. 4A and 4B illustrate the operation of each of the DRPs 38.

As illustrated in FIG. 4A, first, the DRP 38 performs setting in accordance with the content of image processing in response to a received instruction. This setting is performed by changing the internal data path. Subsequently, the DRP 38 accepts the writing of printing information or the like that is information to be processed, and then performs image processing on the printing information in accordance with the setting to generate image information. Then, the DRP 38 accepts the reading of the generated image information. The DRP 38 repeatedly performs the above processes.

As illustrated in FIG. 4B, each of the DRPs 38 has a storage unit 39. The storage unit 39 may be a semiconductor storage element such as a RAM, and includes a pre-processing area 39A that stores printing information, an ongoing-processing area 39B that stores intermediate information to be temporarily stored during the image processing of the DRP 38, and a post-processing area 39C that stores image information obtained as a result of image processing.

Each of the DRPs 38 performs image processing using the associated storage unit 39. Since each storage unit 39 has a finite storage capacity, there is a limitation on the size of printing information processible by a single operation.

Therefore, the image processing apparatus 3 performs a process of dividing printing information into segments, as necessary. The division of printing information is performed by using the image processing controller 134. The process of dividing printing information into segments may be performed in a similar manner when plural DRPs 38 are caused to execute image processing in a distributed manner, as well as in a case where a single DRP 38 is caused to execute image processing.

Figure 5:
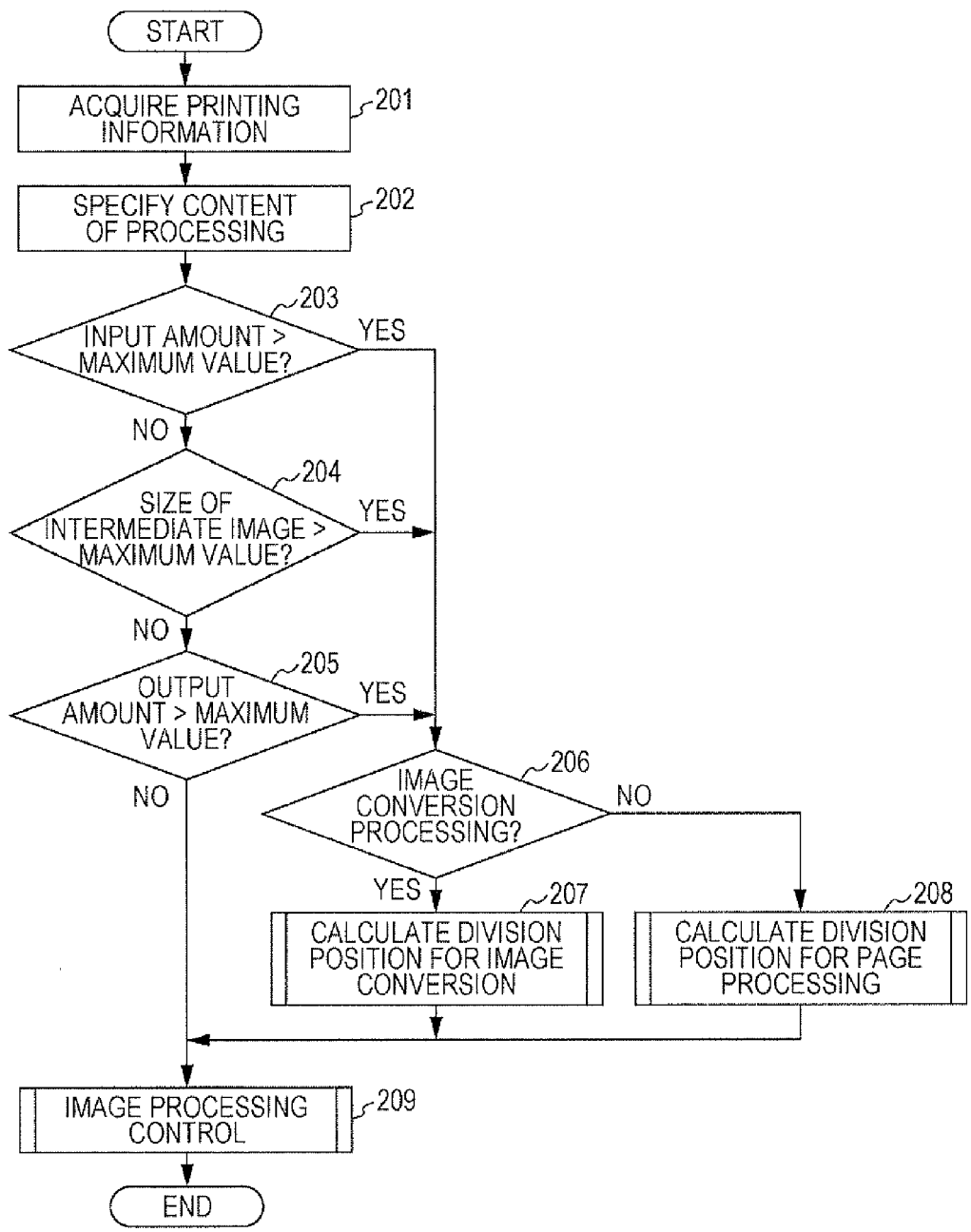
FIG. 5 is a flowchart illustrating a flow of a process for dividing printing information into segments.

Subsequently, a description will be made of the process of dividing printing information into segments, which is performed by using the image processing controller 134. FIG. 5 is a flowchart illustrating a flow of the process of dividing printing information into segments.

First, the image processing controller 134 acquires printing information from the saving unit 132 (step 201), and specifies the content of image processing on the basis of the acquired printing information (step 202). By specifying the content of image processing, it is possible to specify or estimate an amount of printing information input to a DRP 38 to execute image processing, the size of an intermediate image generated during image processing, and an amount of image information output as a result of the processing. The specification or estimation of the amount of the input printing information, the size of the intermediate image, and the amount of the output image information is possible because the specified content of image processing includes the magnification used in the enlargement process or the reduction process, whether a screen is to be used or not, the type of screen, etc.

As a result of specifying the content of image processing, if at least one of the amount of input printing information, the size of the intermediate image, and the amount of output image information exceeds a predetermined maximum value (YES in step 203, YES in step 204, or YES in step 205) and if the specified content indicates image conversion processing (raster image processing (RIP)) (YES in step 206), the image processing controller 134 performs a division position calculation process for image conversion, which will be described below (step 207), and controls image processing to be performed by the DRP 38 (step 209). Then, the process ends.

If the specified content does not indicate image conversion processing but indicates page processing (NO in step 206), the image processing controller 134 performs a division position calculation process for page processing, which will be described below (step 208), and controls image processing to be performed by the DRP 38 (step 209). Then, the process ends.

The maximum value of each of the amount of input printing information, the size of the intermediate image, and the amount of output image information is a value predetermined in accordance with the storage capacity of the storage unit 39 included in the DRP 38 (the maximum values of the amount of input printing information, the size of the intermediate image, and the amount of output image information correspond to the sizes of the pre-processing area 39A, the ongoing-processing area 39B, and the post-processing area 39C, respectively).

As a result of specifying the content of image processing, if the amount of input printing information, the size of the intermediate image, and the amount of output image information do not exceed the respective predetermined maximum values (NO in step 203, NO in step 204, or NO in step 205), the image processing controller 134 determines that it is not necessary to divide printing information into segments, and controls image processing to be performed by the DRP 38 (step 209). Then, the process ends.

Figure 6:
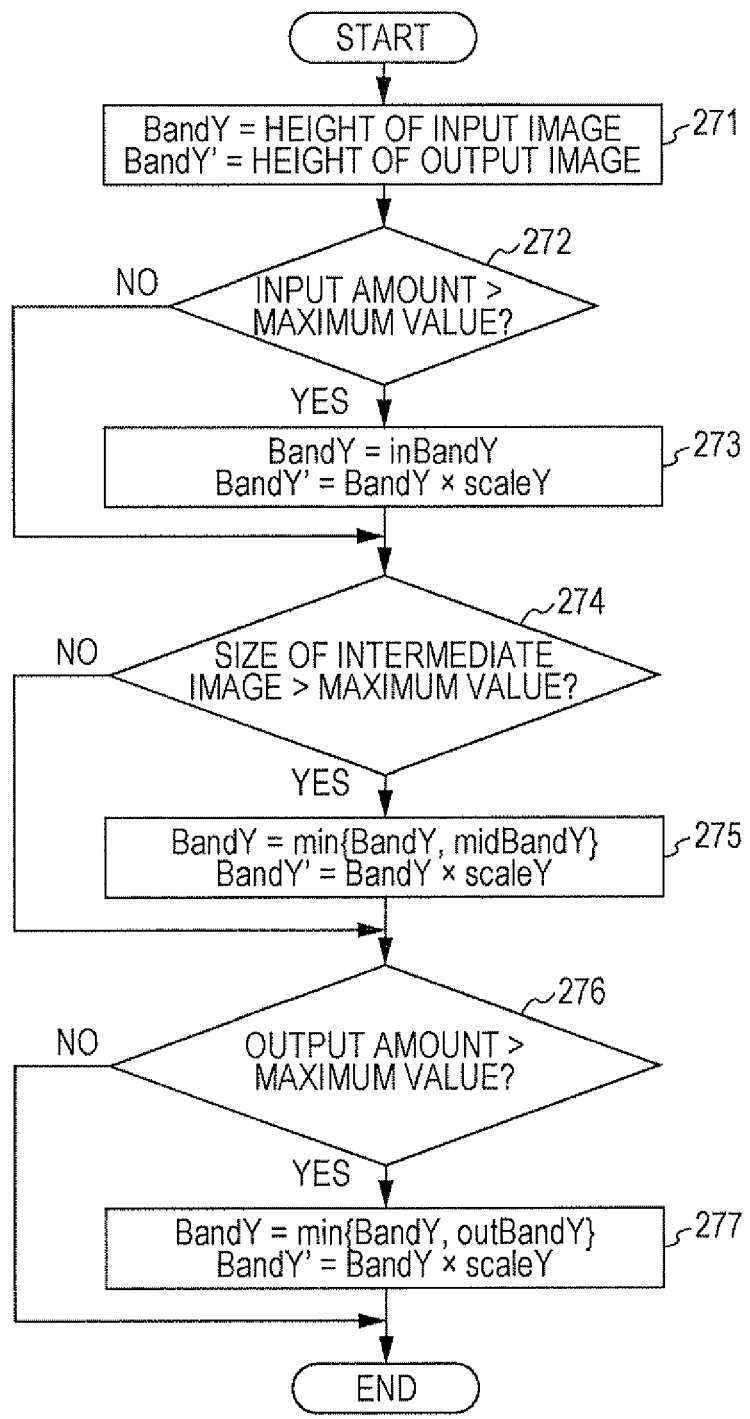
FIG. 6 is a flowchart illustrating a flow of a division position calculation process for image conversion.

Next, a description will be made of the division position calculation process for image conversion, which is executed in step 207. FIG. 6 is a flowchart illustrating a flow of the division position calculation process for image conversion, and FIGS. 7A to 7D illustrate the division position calculation process for image conversion.

When the division position calculation process starts, first, the image processing controller 134 enters the value of the height of an input image into a variable BandY, and enters the value of the height of an output image into a variable BandY' (step 271). Since image processing is performed row by row, the number of rows is represented by the height of an image, and a division position is determined. The height of an image corresponds to the magnitude in the Y-axis direction if the direction of the rows is the X-axis direction of the orthogonal coordinates.

If the amount of input printing information exceeds the capacity of the pre-processing area 39A of the storage unit 39, which is an input buffer (YES in step 272), the maximum value in BandY of an amount of printing information within the capacity of the pre-processing area 39A (see FIG. 7A) is entered into the variable BandY, and a value obtained by multiplying the variable BandY by an enlargement and reduction ratio scaleY in the height direction is entered into the variable BandY' (step 273). If the amount of input printing information is within the capacity of the pre-processing area 39A (NO in step 272), the values of the variables BandY and BandY' remain unchanged.

If the size of the intermediate image exceeds the capacity of the ongoing-processing area 39B of the storage unit 39 (YES in step 274), the smaller one of the maximum value midBandY of the size of the intermediate image within the capacity of the ongoing-processing area 39B (see FIG. 7B) and the value of the variable BandY is entered into the variable BandY, and a value obtained by multiplying the variable BandY by the enlargement and reduction ratio scaleY in the height direction is entered into the variable BandY' (step 275). That is, the new value of the variable BandY is the smallest one of the height of the input image entered into the variable BandY as an initial value in step 271, the value in BandY entered into the variable BandY in step 273, and the value midBandY. If the size of the intermediate image does not exceed the capacity of the ongoing-processing area 39B of the storage unit 39 (NO in step 274), the values of the variables BandY and BandY' remain unchanged.

If the amount of output image information exceeds the capacity of the post-processing area 39C of the storage unit 39, which is an output buffer (YES in step 276), the smaller one of the maximum value outBandY of the amount of image information within the capacity of the post-processing area 39C (see FIG. 7C) and the value of the variable BandY is entered into the variable BandY, and a value obtained by multiplying the variable BandY by the enlargement and reduction ratio scaleY in the height direction is entered into the variable BandY' (step 277). Then, the division position calculation process ends. If the amount of output image information is within the capacity of the post-processing area 39C (NO in step 276), the values of the variables BandY and BandY' remain unchanged. Then, the division position calculation process ends.

In the division position calculation process, the finally obtained value of the variable BandY represents the height by which the input image is to be divided. That is, the new value of the variable BandY is the smallest one of the value of the height of the input image entered into the variable BandY as an initial value in step 271, the value in BandY entered into the variable BandY in step 273, the value midBandY that may be entered into the variable BandY in step 275, and the value outBandY that may be entered into the variable BandY in step 277 (if NO is determined in steps 272, 274, and 276, the values in BandY, midBandY, and outBandY are not calculated, respectively; even if the values in BandY, midBandY, and outBandY are calculated, each of the calculated values will be equal to the value of the height of the input image entered into the variable BandY as an initial value in step 271).

Figure 7A:
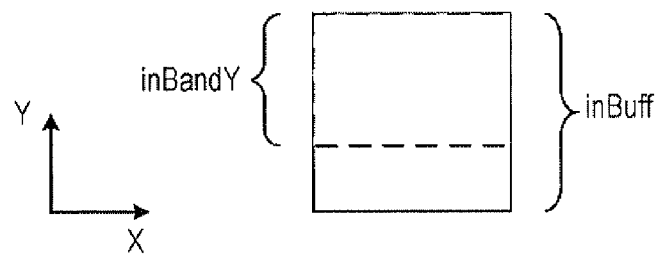
FIGS. 7A to 7D illustrate the division position calculation process for image conversion.
Figure 7B:
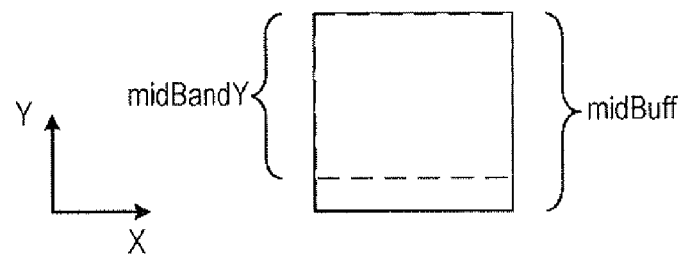
Figure 7C:
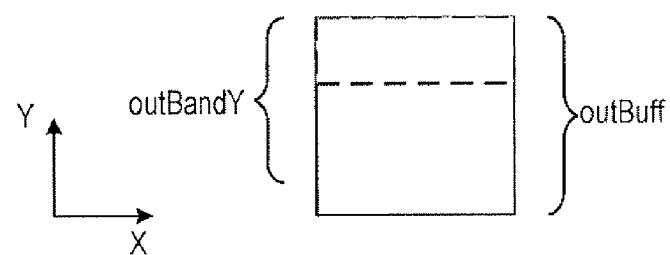
Figure 7D:
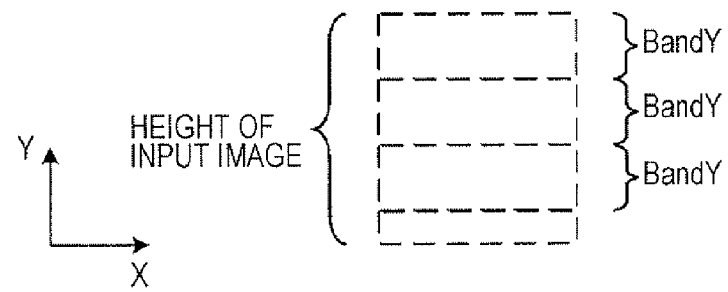

As a result, for example, as illustrated in FIG. 7D, the input image is divided into plural sub-images each having a height equal to the value of the variable BandY and one sub-image having a height less than the value of the variable BandY. Depending on the value represented by the variable BandY (in a case where the remainder when the height of the input image is divided by the value of the variable BandY is 0), the input image may be divided into plural sub-images each having a height equal to the value of the variable BandY.

The value of the variable BandY' representing the height of the output image is used to read an output image described below, and is not used in the division position calculation process. Thus, the processing regarding the variable BandY' may be omitted.

Figure 9:
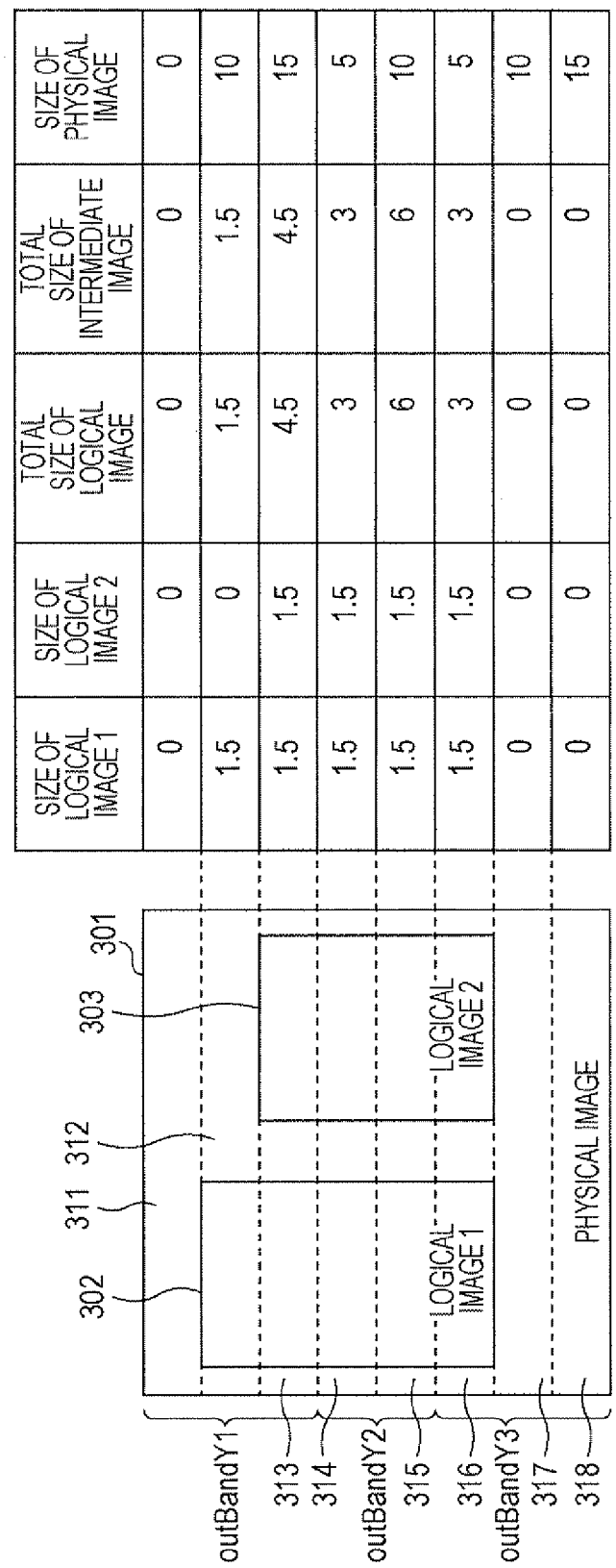
FIG. 9 illustrates the division position calculation process for page processing.

Next, a description will be made of the division position calculation process for page processing, which is executed in step 208. FIG. 8 is a flowchart illustrating a flow of the division position calculation process for page processing, and FIG. 9 illustrates the division position calculation process for page processing.

When the division position calculation process starts, first, the image processing controller 134 initializes the value of the variable BandY' representing the height of an output image to 0, and also initializes a variable for holding the size of a logical image, a variable for holding the size of an intermediate image, and a variable for holding the size of a physical image to 0 (step 281). The size of the logical image corresponds to the amount of printing information, the size of the intermediate image represents the size of an intermediate image generated by processing the printing information, and the size of the physical image corresponds to the size of the output image.

Then, the image processing controller 134 adds the size of a logical image included in the first row of the input image (printing information), the size of an intermediate image generated by processing the first row of the printing information, and the size of an output image generated based on the first row of the printing information to the variables for holding the sizes of the respective images (step 282).

As a result of addition, if the size of the logical image exceeds the capacity of the pre-processing area 39A of the storage unit 39 (YES in step 283), if the size of the intermediate image exceeds the capacity of the ongoing-processing area 39B of the storage unit 39 (YES in step 284), or if the size of the physical image exceeds the capacity of the post-processing area 39C of the storage unit 39 (YES in step 285), the image processing controller 134 calculates the height BandY of the input image corresponding to the value of the variable BandY' (step 286), and registers the calculated value BandY and the value of the variable BandY' in a list (step 287). Then, the process returns to step 281. Any one of the calculated value BandY and the value of the variable BandY' may be registered in the list.

As a result of the addition of the size of the logical image, the size of the intermediate image, and the size of the output image, if the size of the logical image does not exceed the capacity of the pre-processing area 39A (NO in step 283), if the size of the intermediate image does not exceed the capacity of the ongoing-processing area 39B (NO in step 284), or if the size of the physical image does not exceed the capacity of the post-processing area 39C (NO in step 285), 1 is added to the value of the variable BandY' (step 288). If the processing of step 282 is not the processing for the last row of the input image (NO in step 289), the process returns to step 282. If the processing of step 282 is the processing for the last row of the input image (YES in step 289), the division position calculation process ends.

Before the end of the division position calculation process, processing similar to the processing of calculating the height BandY of the input image corresponding to the value of the variable BandY' in step 286 and the processing of registering the value BandY and the value of the variable BandY' in the list in step 287 may be performed. However, such processing may not necessarily be performed because the values for the portion including the last row are uniquely determined even if the values are not registered.

The division position calculation process will now be specifically described. Here, by way of example, a physical image 301 illustrated in FIG. 9 is output as image information based on printing information. The physical image 301 includes logical images 302 and 303, and has eight rows, that is, rows 311, 312, 313, 314, 315, 316, 317, and 318. Further, by way of example, the pre-processing area 39A has a capacity of 8, the ongoing-processing area 39B has a capacity of 10, and the post-processing area 39C has a capacity of 15.

First, the initialization process is completed (step 281), and the size of a logical image corresponding to the row 311, which is the first row, the size of an intermediate image, and the size of an output image are added to the variables for holding the sizes of the respective images (step 282). Since the row 311 includes no logical images, the size of the logical image and the size of the intermediate image are still 0, and the size of the output image is 5. Consequently, the size of the logical image, the size of the intermediate image, and the size of the output image do not exceed the respective maximum values (the capacities of the pre-processing area 39A, the ongoing-processing area 39B, and the post-processing area 39C). Thus, the value of the variable BandY' representing the height of the output image is 1 (step 288).

Subsequently, the size of a logical image corresponding to the row 312, the size of an intermediate image, and the size of an output image are added to the variables for holding the sizes of the respective images (step 282). Since the row 312 includes part of the logical image 302, the size of the logical image is 1.5, the size of the intermediate image is 1.5, and the size of the output image is 10. Consequently, the size of the logical image, the size of the intermediate image, and the size of the output image do not exceed the respective maximum values, and the value of the variable BandY' representing the height of the output image is 2 (step 288).

Then, the size of a logical image corresponding to the row 313, the size of an intermediate image, and the size of an output image are added to the variables for holding the sizes of the respective images (step 282). Since the row 313 includes part of the logical images 302 and 303, the size of the logical image is 4.5, the size of the intermediate image is 4.5, and the size of the output image is 15. Consequently, the size of the logical image, the size of the intermediate image, and the size of the output image do not exceed the respective maximum values, and the value of the variable BandY' representing the height of the output image is 3 (step 288).

Further, the size of a logical image corresponding to the row 314, the size of an intermediate image, and the size of an output image are added to the variables for holding the sizes of the respective images (step 282). Since the row 314 includes part of the logical images 302 and 303, the size of the logical image is 7, the size of the intermediate image is 7, and the size of the output image is 20. Consequently, the size of the output image exceeds 15, which is the maximum value (YES in step 285). Thus, the value of the variable BandY' representing the height of the output image obtained at the current time, i.e., 3, is registered in the list (step 287).

Subsequently, the individual variables are initialized (step 281), and the size of a logical image corresponding to the row 314, the size of an intermediate image, and the size of an output image are added to the variables for holding the sizes of the respective images (step 282). Since the row 314 includes part of the logical images 302 and 303, the size of the logical image is 3, the size of the intermediate image is 3, and the size of the output image is 5. Consequently, the size of the logical image, the size of the intermediate image, and the size of the output image do not exceed the respective maximum values, the value of the variable BandY' representing the height of the output image is 1 (step 288).

Then, the size of a logical image corresponding to the row 315, the size of an intermediate image, and the size of an output image are added to the variables for holding the sizes of the respective images (step 282). Since the row 315 includes part of the logical images 302 and 303, the size of the logical image is 6, the size of the intermediate image is 6, and the size of the output image is 10. Consequently, the size of the logical image, the size of the intermediate image, and the size of the output image do not exceed the respective maximum values, and the value of the variable BandY' representing the height of the output image is 2 (step 288).

Further, the size of a logical image corresponding to the row 316, the size of an intermediate image, and the size of an output image are added to the variables for holding the sizes of the respective images (step 282). Since the row 316 includes part of the logical images 302 and 303, the size of the logical image is 9, the size of the intermediate image is 9, and the size of the output image is 15. Consequently, the size of the logical image exceeds 8, which is the maximum value (YES in step 283). Thus, the value of the variable BandY' representing the height of the output image obtained at the current time, i.e., 2, is registered in the list (step 287).

Subsequently, the individual variables are initialized (step 281), and the size of a logical image corresponding to the row 316, the size of an intermediate image, and the size of an output image are added to the variables for holding the sizes of the respective images (step 282). Since the row 316 includes part of the logical images 302 and 303, the size of the logical image is 3, the size of the intermediate image is 3, and the size of the output image is 5. Consequently, the size of the logical image, the size of the intermediate image, and the size of the output image do not exceed the respective maximum values, the value of the variable BandY' representing the height of the output image is 1 (step 288).

Then, the size of a logical image corresponding to the row 317, the size of an intermediate image, and the size of an output image are added to the variables for holding the sizes of the respective images (step 282). Since the row 317 includes no logical images, the size of the logical image and the size of the intermediate image are still 3, and the size of the output image is 5. Consequently, the size of the logical image, the size of the intermediate image, and the size of the output image do not exceed the respective maximum values, and the value of the variable BandY' representing the height of the output image is 2 (step 288).

Further, the size of a logical image corresponding to the row 318, the size of an intermediate image, and the size of an output image are added to the variables for holding the sizes of the respective images (step 282). Since the row 318 includes no logical images, the size of the logical image and the size of the intermediate image are still 3, and the size of the output image is 10. Consequently, the size of the logical image, the size of the intermediate image, and the size of the output image do not exceed the respective maximum values, and the value of the variable Bandy' representing the height of the output image is 3 (step 288). Since the row 318 is the last row (YES in step 289), the division process ends.

Figure 10:
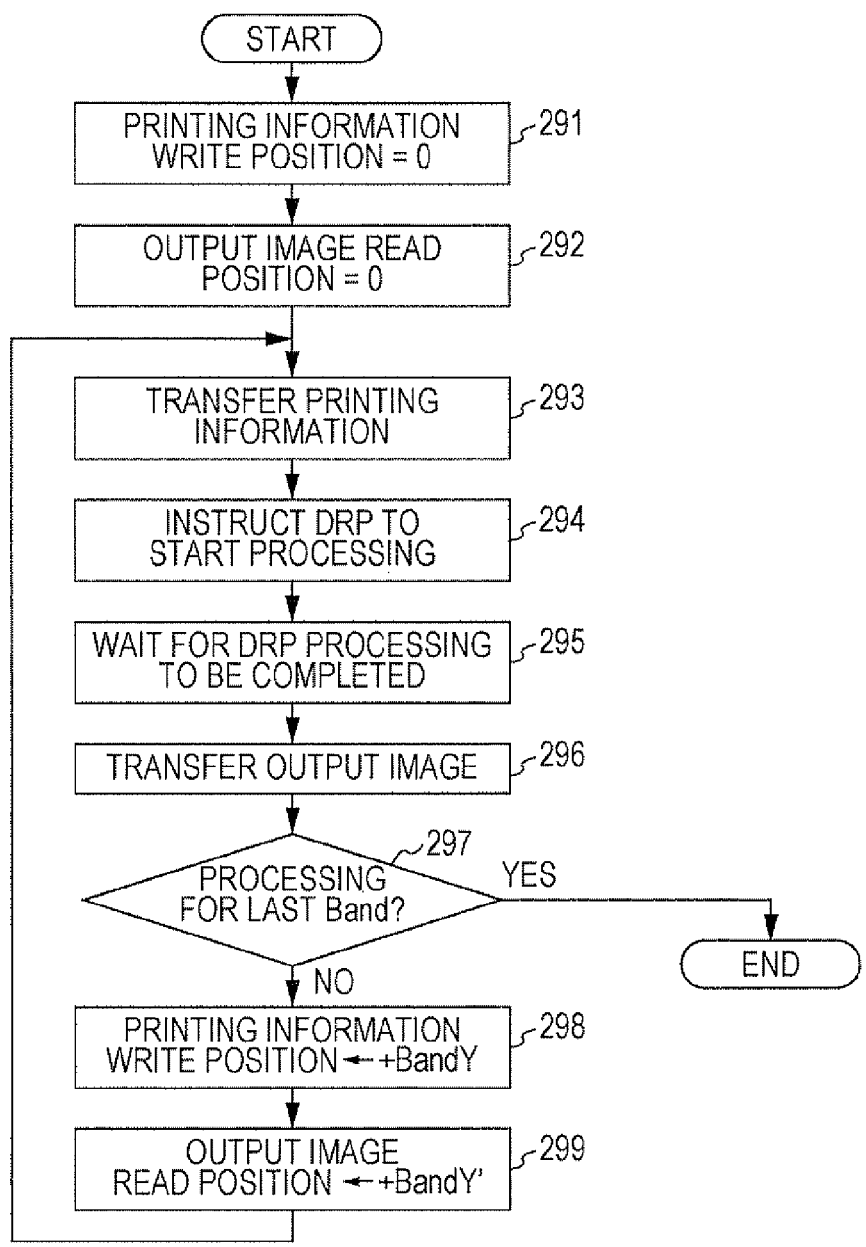
FIG. 10 is a flowchart illustrating a flow of an image processing control process.

Next, a description will be made of the image processing control process executed in step 209. FIG. 10 is a flowchart illustrating a flow of the image processing control process.

In the image processing control process, first, the image processing controller 134 initializes a printing information write position that is a start position at which the printing information is written to the storage unit 39 included in the DRP 38 to 0 (the value indicating the beginning of the printing information) (step 291). In addition, the image processing controller 134 also initializes an image information read position that is a start position at which the image information is read from the storage unit 39 to 0 (the value indicating the beginning of the image information) (step 292).

Subsequently, the image processing controller 134 transfers the printing information to the storage unit 39 and writes the printing information to the storage unit 39 in accordance with the printing information write position (step 293). An amount of printing information to be written is determined on the basis of the division position (value BandY) calculated in the processing of step 207 or 208. If no division is required (NO in step 205), the entire amount of printing information is written in the storage unit 39.

When the writing of the printing information is completed, the image processing controller 134 instructs the DRP 38 through the DRP controller 135 to start image processing (step 294), and waits for the image processing performed by the DRP 38 to be completed (step 295).

When the image processing performed by the DRP 38 is completed, the image processing controller 134 transfers and reads image information from the storage unit 39 (step 296). The read image information is saved in the saving unit 132. Before the image information is saved, pieces of image information read in accordance with image information read positions are combined. If the image information read position is 0, image information read at the image information read position is at the beginning of information, and therefore is not combined.

If the image information read from the storage unit 39 is the last segment (Band) (YES in step 297), the image processing controller 134 terminates the image processing control process. Image information obtained in a case where printing information that is not divided into segments is processed is the last segment. Therefore, also in this case, the image processing controller 134 terminates the image processing control process.

If the image information read from the storage unit 39 is not the last segment (NO in step 297), the image processing controller 134 shifts the printing information write position by an amount corresponding to the value BandY calculated in the processing of step 207 or 208 (step 298), and shifts the image information read position by an amount corresponding to the value BandY' calculated in the processing of step 207 or 208 (step 299). Then, the process returns to step 293, and the process is repeatedly performed in a similar manner.

Second Exemplary Embodiment

In the first exemplary embodiment, a description has been given of an example in which the division process is performed if at least one of an amount of input printing information, the size of an intermediate image, and an amount of output image information exceeds a value predetermined in accordance with the storage capacity of the storage unit 39 included in each of the DRPs 38. In a second exemplary embodiment, in contrast, the division process is performed in accordance with a predetermined setting, regardless of the storage capacity of the storage unit 39. The division process may be used when, for example, plural DRPs 38 are caused to perform image processing in a distributed manner.

Figure 11:
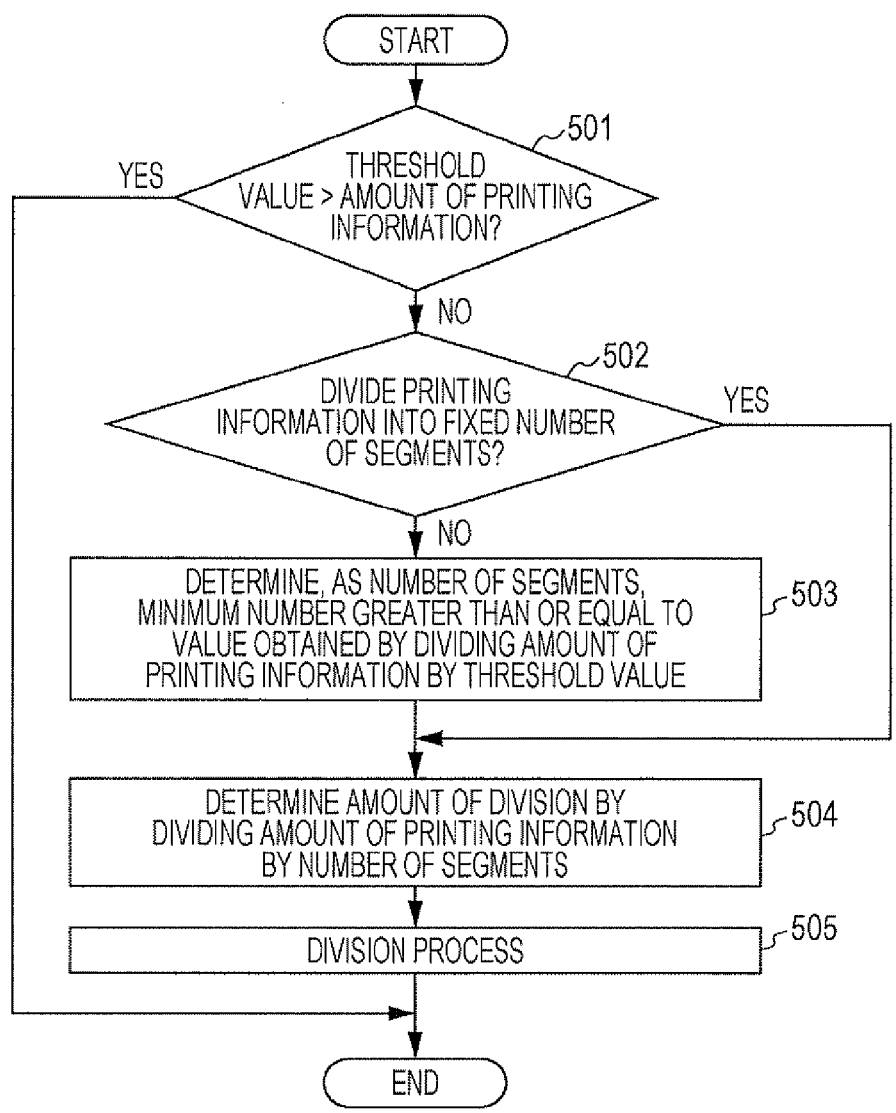
FIG. 11 is a flowchart illustrating a flow of a division process according to a second exemplary embodiment.

FIG. 11 is a flowchart illustrating a flow of the division process according to the second exemplary embodiment.

In the division process, first, the image processing controller 134 checks whether or not an amount of printing information is less than a predetermined threshold value. As a result of the check, if the amount of printing information is less than the threshold value (YES in step 501), the printing information is not divided into segments. The threshold value may be determined in advance on the basis of, for example, an amount of printing information on which image processing performed by plural DRPs 38 in a distributed manner would be determined to have a small effect.

If the amount of printing information is greater than or equal to the threshold value (NO in step 501), it is determined whether the printing information is divided into a fixed number of segments or is divided into segments in accordance with an amount of division. This determination is made in accordance with a predetermined setting, and the setting includes a value representing a fixed number of segments into which the printing information is divided, or a threshold value (this threshold value is different from the threshold value on which the determination in step 501 is based) representing an amount of division in accordance with which the printing information is divided into segments.

If the printing information is divided into segments in accordance with an amount of division (NO in step 502), the image processing controller 134 determines, as the number of segments into which the printing information is to be divided, the smallest natural number greater than or equal to a value obtained by dividing an amount of printing information by the threshold value (step 503).

Subsequently, the image processing controller 134 determines each individual amount of division obtained when the printing information is divided, as a value obtained by dividing the amount of printing information by the number of segments (step 504). That is, if the printing information is divided into segments in accordance with an amount of division, the amount of division is determined in accordance with the number of segments determined in step 503. If the printing information is divided into a fixed number of segments (YES in step 502), the amount of division is determined in accordance with a predetermined number of segments.

The amount of division determined in step 504 corresponds to the value of the variable BandY described above in the first exemplary embodiment. If the image processing based on the printing information is image conversion processing, the image processing controller 134 performs a division position calculation process similar to the process according to the first exemplary embodiment described with reference to FIG. 6. If the image processing based on the printing information is page processing, the image processing controller 134 performs a division position calculation process substantially similar to the division position calculation process according to the first exemplary embodiment described with reference to FIG. 8. After that, the image processing controller 134 performs a process for dividing the printing information into segments (step 505). Then, the division process ends.

Here, a division position calculation process performed when the image processing based on the printing information is page processing will be described focusing on the difference from the division position calculation process described in the first exemplary embodiment.

The division position calculation process according to the second exemplary embodiment is not based on the capacity of each of the storage units 39 but is a division process used when, for example, plural DRPs 38 are caused to perform image processing in a distributed manner. It is therefore desirable that a division process be performed in order to divide the printing information into segments as appropriate. Accordingly, the division position calculation process according to the second exemplary embodiment is based on an amount of printing information, that is, the size of a logical image, and no consideration is given to the size of an intermediate image and the size of an output image (which is similar to a process that does not include the processing of steps 284 and 285 in FIG. 8).

Figure 12:
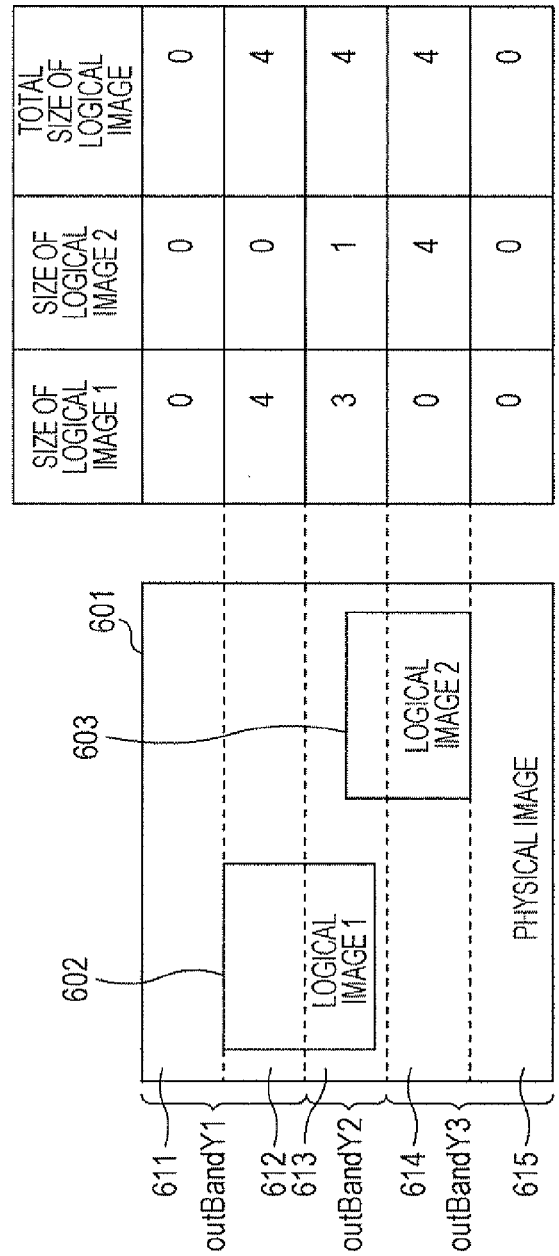
FIG. 12 illustrates a division position calculation process according to the second exemplary embodiment.

For example, a physical image 601 illustrated in FIG. 12 is output as image information on the basis of printing information. The physical image 601 includes logical images 602 and 603, and has rows 611, 612, 613, 614, and 615. Further, by way of example, the amount of division of the printing information which is determined in step 504 is 4.

Since the row 611 includes no logical images, the size of the logical image is 0. The size of the logical image does not exceed the amount of division, or 4, and therefore, the current value of the variable BandY' representing the height of an output image is 1.

Subsequently, since the row 612 includes part of the logical image 602, the size of the logical image is 4. The size of the logical image does not exceed the amount of division, or 4, and therefore, the current value of the variable BandY' representing the height of an output image is 2.

Further, since the row 613 includes part of the logical images 602 and 603, the size of the logical image is 8. The size of the logical images 602 and 603 exceeds the amount of division, or 4, and therefore, the previous value of the height of the output image representing the variable BandY', i.e., 2, is the value representing the division position.

Further, since the row 613 includes part of the logical images 602 and 603, the size of the logical image is 4. The size of the logical image does not exceed the amount of division, or 4, and therefore, the current value of the variable BandY' representing the height of an output image is 1.

Since the row 614 includes part of the logical image 603, the size of the logical image is 8. The size of the logical images 602 and 603 exceeds the amount of division, or 4, and therefore, the previous value of the height of the output image representing the variable BandY', i.e., 1, is the value representing the division position.

In this manner, printing information for which the physical image 601 illustrated in FIG. 12 is output as image information is divided into three parts, that is, a segment outBandY1 including the rows 611 and 612, a segment outBandY2 including the row 613, and a segment outBandY3 including the rows 614 and 615.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    an image processing unit that dynamically changes a configuration thereof and that executes image processing in accordance with the changed configuration;
    a memory including
        a pre-processing information memory area that stores setting information for setting a change of the configuration of the image processing unit, and printing information used for image processing to be performed by the image processing unit,
        an ongoing-processing information memory area that stores intermediate information to be generated during image processing performed by the image processing unit, and
        a post-processing information memory area that stores image information generated through the image processing performed by the image processing unit;
    a determination unit that calculates, when causing the image processing unit to execute image processing, an amount of printing information, an amount of intermediate information corresponding to the printing information, and an amount of image information corresponding to the printing information, in accordance with printing information to be used for the image processing to be executed, and that determines a division position of the printing information at which the amount of printing information, the amount of intermediate information, and the amount of image information are less than or equal to a memory capacity of the pre-processing information memory area, a memory capacity of the ongoing-processing information memory area, and a memory capacity of the post-processing information memory area, respectively; and
    a dividing unit that divides the printing information to be used for the image processing to be executed by the image processing unit in accordance with the division position determined by the determination unit.

2. The image processing apparatus according to claim 1, wherein
    when the image processing to be executed by the image processing unit is page processing,
    the determination unit determines a division position of the image information in accordance with the amount of printing information, the amount of intermediate information, and the amount of image information, and determines a division position of the printing information in accordance with the determined division position.

3. A non-transitory computer readable medium storing a program causing a computer to execute a process, the process comprising:
    calculating, when causing an image processing unit that dynamically changes a configuration thereof and that executes image processing in accordance with the changed configuration to execute image processing, an amount of printing information, an amount of intermediate information that corresponds to the printing information and that is to be generated during the image processing performed by the image processing unit, and an amount of image information that corresponds to the printing information and that is generated through the image processing performed by the image processing unit, in accordance with printing information to be used for the image processing to be executed, and determining a division position of the printing information at which the amount of printing information, the amount of intermediate information, and the amount of image information are less than or equal to a memory capacity of a pre-processing information memory area, a memory capacity of an ongoing-processing information memory area, and a memory capacity of a post-processing information memory area in a memory included in the image processing unit, respectively,
        the pre-processing information memory area storing setting information for setting a change of the configuration of the image processing unit, and printing information used for image processing to be performed by the image processing unit,
        the ongoing-processing information memory area storing the intermediate information,
        the post-processing information memory area storing the image information; and
    dividing the printing information to be used for the image processing to be executed by the image processing unit in accordance with the division position determined in the determining.

4. The non-transitory computer readable medium according to claim 3, wherein
    when the image processing to be executed by the image processing unit is page processing,
    the determining determines a division position of the image information in accordance with the amount of printing information, the amount of intermediate information, and the amount of image information, and determines a division position of the printing information in accordance with the determined division position.

* * * * *